US012711798B2

(12) United States Patent
Ye et al.

(10) Patent No.: US 12,711,798 B2
(45) Date of Patent: Aug. 18, 2026

(54) DOCUMENT EXTRACTION TEMPLATE INDUCTION

(71) Applicant: Google LLC, Mountain View, CA (US)

(72) Inventors: Tianjun Ye, Issaquah, WA (US); Younghwan Jung, Sunnyvale, CA (US); Xiaoqi Ren, Bothell, WA (US); Wael Farhan, Kirkland, WA (US); Tianjun Fu, Sunnyvale, CA (US); Nikolaos Kofinas, Mountain View, CA (US); Nikolay Alexeevich Glushnev, Woodinville, WA (US); Matthew Eastberg Persons, Kirkland, WA (US); Xiao Liu, San Francisco, CA (US); Evan S. Huang, Cupertino, CA (US); Emmanouil Koukoumidis, Kirkland, WA (US); Bhavishya Mittal, Bellevue, WA (US)

(73) Assignee: Google LLC, Mountain View, CA (US)

( * ) Notice: Subject to any disclaimer, the term of this patent is extended or adjusted under 35 U.S.C. 154(b) by 347 days.

(21) Appl. No.: 17/817,058

(22) Filed: Aug. 3, 2022

(65) Prior Publication Data

US 2024/0046686 A1 Feb. 8, 2024

(51) Int. Cl.

| | |
|---|---|
| ***G06V 30/418*** | (2022.01) |
| ***G06V 30/18*** | (2022.01) |
| ***G06V 30/19*** | (2022.01) |
| ***G06V 30/412*** | (2022.01) |
| ***G06V 30/414*** | (2022.01) |

(52) U.S. Cl.

CPC ...... *G06V 30/418* (2022.01); *G06V 30/18152* (2022.01); *G06V 30/19107* (2022.01); *G06V 30/19147* (2022.01); *G06V 30/1918* (2022.01); *G06V 30/412* (2022.01); *G06V 30/414* (2022.01)

(58) Field of Classification Search

CPC .......... G06V 30/418; G06V 30/18152; G06V 30/19107; G06V 30/19147; G06V 30/1918; G06V 30/412; G06V 30/414; G06F 18/23

See application file for complete search history.

(56) References Cited

U.S. PATENT DOCUMENTS

| | | | | |
|---|---|---|---|---|
| 2015/0127323 | A1* | 5/2015 | Jacquet | G06F 40/247 704/9 |
| 2021/0248420 | A1* | 8/2021 | Zhong | G06V 10/82 |
| 2022/0083611 | A1* | 3/2022 | Malhotra | G06F 16/958 |
| 2022/0237373 | A1* | 7/2022 | Singh Bawa | G06N 20/00 |

* cited by examiner

*Primary Examiner* — Andrew M Moyer
*Assistant Examiner* — Ahmed A Nasher
(74) *Attorney, Agent, or Firm* — Honigman LLP; Brett A. Krueger

(57) ABSTRACT

A method for document extraction includes receiving, from a user device associated with a user, an annotated document that includes one or more fields. Each respective field of the one or more fields of the annotated document is labeled by a respective annotation. The method includes clustering, using a template matching algorithm, the annotated document into a cluster and inducing, using the annotated document, a document template for the cluster. The method includes receiving, from the user device, an unannotated document including the one or more fields. The method includes clustering, using the template matching algorithm, the unannotated document into the cluster and, in response to clustering the unannotated document into the cluster, extracting, using the document template, the one or more fields.

20 Claims, 8 Drawing Sheets

DOCUMENT EXTRACTION TEMPLATE INDUCTION

TECHNICAL FIELD

This disclosure relates to document extraction template induction.

BACKGROUND

Entity extraction is a popular technique that identifies and extracts key information from documents (e.g., forms). Entity extraction tools generally require a user to select a template for a particular document and then the entity extraction tool will extract entities from the document using the selected template.

SUMMARY

One aspect of the disclosure provides a method for document extraction template induction. The computer-implemented method, when executed by data processing hardware, causes the data processing hardware to perform operations. The operations include receiving, from a user device associated with a user, an annotated document. The annotated document includes one or more fields and each respective field of the one or more fields of the annotated document is labeled by a respective annotation. The operations include clustering, using a template matching algorithm, the annotated document into a cluster and inducing, using the annotated document, a document template for the cluster. The operations include receiving, from the user device, an unannotated document comprising the one or more fields and clustering, using the template matching algorithm, the unannotated document into the cluster. In response to clustering the unannotated document into the cluster, the operations include extracting, using the document template, the one or more fields.

Implementations of the disclosure may include one or more of the following optional features. In some implementations, inducing the document template for the cluster includes training an extraction model using the annotated document. Optionally, the operations further include combining the extraction model for the cluster with another extraction model from a different cluster. In some examples, the operations further include receiving, from the user device, a second annotated document including one or more different fields where each respective different field of the one or more different fields of the second annotated document labeled by a respective annotation, clustering, using the template matching algorithm, the second annotated document into a second cluster, and inducing, from the second annotated document, a second document template for the second cluster.

In some examples, obtaining the annotated document includes requesting, from the user device, the annotated document. The template matching algorithm may include an unsupervised algorithm. In some implementations, each respective annotation includes a tag and a bounding box. In some examples, the annotated document includes a form.

In some implementations, the operations further include receiving, from the user device, a set of unannotated documents. Each respective unannotated document of the set of unannotated documents includes one or more respective fields. The operations may also further include, for each respective unannotated document in the set of unannotated documents, clustering, using the template matching algorithm, the respective unannotated document into a respective cluster that is associated with a respective document template and extracting, using the respective document template, the one or more respective fields. The template matching algorithm may include a bag-of-words algorithm.

Another aspect of the disclosure provides a system for document extraction template induction. The system includes data processing hardware and memory hardware in communication with the data processing hardware. The memory hardware stores instructions that when executed on the data processing hardware cause the data processing hardware to perform operations. The operations include receiving, from a user device associated with a user, an annotated document. The annotated document includes one or more fields and each respective field of the one or more fields of the annotated document is labeled by a respective annotation. The operations include clustering, using a template matching algorithm, the annotated document into a cluster and inducing, using the annotated document, a document template for the cluster. The operations include receiving, from the user device, an unannotated document comprising the one or more fields and clustering, using the template matching algorithm, the unannotated document into the cluster. In response to clustering the unannotated document into the cluster, the operations include extracting, using the document template, the one or more fields.

This aspect may include one or more of the following optional features. In some implementations, inducing the document template for the cluster includes training an extraction model using the annotated document. Optionally, the operations further include combining the extraction model for the cluster with another extraction model from a different cluster. In some examples, the operations further include receiving, from the user device, a second annotated document including one or more different fields where each respective different field of the one or more different fields of the second annotated document labeled by a respective annotation, clustering, using the template matching algorithm, the second annotated document into a second cluster, and inducing, from the second annotated document, a second document template for the second cluster.

In some examples, obtaining the annotated document includes requesting, from the user device, the annotated document. The template matching algorithm may include an unsupervised algorithm. In some implementations, each respective annotation includes a tag and a bounding box. In some examples, the annotated document includes a form.

In some implementations, the operations further include receiving, from the user device, a set of unannotated documents. Each respective unannotated document of the set of unannotated documents includes one or more respective fields. The operations may also further include, for each respective unannotated document in the set of unannotated documents, clustering, using the template matching algorithm, the respective unannotated document into a respective cluster that is associated with a respective document template and extracting, using the respective document template, the one or more respective fields. The template matching algorithm may include a bag-of-words algorithm.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Entity extraction or document extraction is a popular technique that identifies and extracts key information from documents. Entity extraction tools may classify the information into predefined categories which coverts previously unstructured data into structured data that downstream applications may use in any number of ways. For example, entity extraction tools may process unstructured data to extract data from documents or forms to automate many data entry tasks.

Conventional entity extraction tools generally require users to provide the tool with documents that are associated with a known template. For example, the user, when uploading a document, explicitly selects the template the tool is to use for extraction. However, when a user has a large number of documents, selecting the proper template is quite burdensome.

Implementations herein include a document extractor that allows users to upload or provide many documents simultaneously. Each document may be associated with a different template. The document extractor uses clustering to sort the provided documents into clusters, induce templates for the clusters, and automatically extracts entities from the documents without requiring the user to specify any templates.

Figure 1:
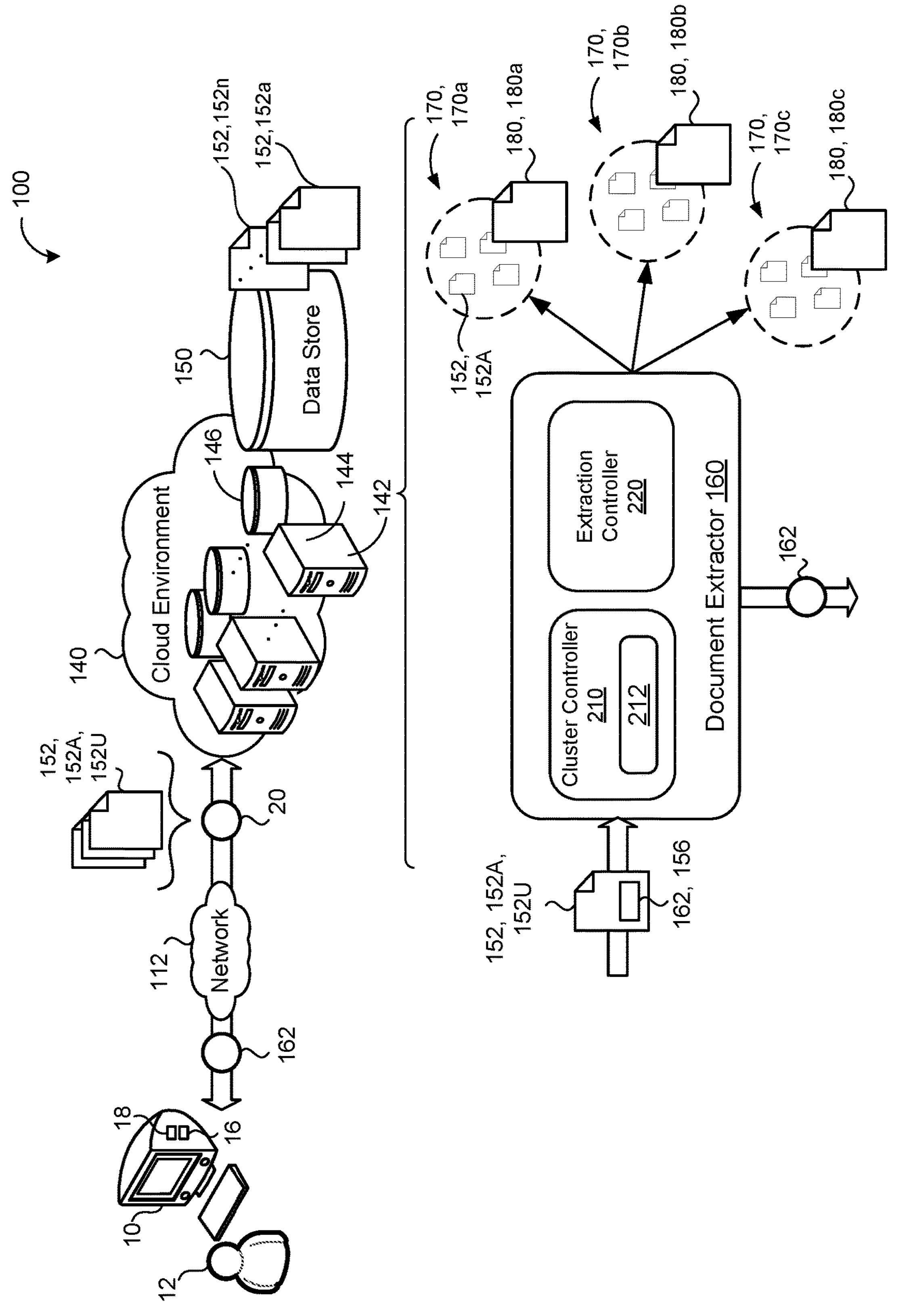
FIG. 1 is a schematic view of an example system for document extraction template induction.

Referring to FIG. 1, in some implementations, an example document entity extraction system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a set of documents 152, 152*a*—n. The documents 152 may be of any type and from any source (e.g., from the user, other remote entities, or generated by the remote system 140).

The remote system 140 is configured to receive an entity extraction request 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The request 20 may include one or more documents 152 for entity extraction. Additionally or alternatively, the request 20 may refer to one or more documents 152 stored at the data store 150 for entity extraction. The request 20 may be part of a query, such as a Structured Query Language (SQL) query generated by the user device 10.

The remote system 140 executes a document extractor 160 for extracting structured entities 162 from the documents 152 (e.g., forms). The entities 162 represent information (e.g., values) extracted from the document that has been classified into a predefined category. In some examples, each entity 162 includes a key-value pair, where the key is the classification and the value represents the value extracted from the document 152. For example, an entity 162 extracted from a form includes a key (or label or classification) of "name" and a value of "Jane Smith." The document entity extractor 160 receives the documents 152 from, for example, the user device 10 and/or the data store 150.

In some implementations, the document extractor 160 receives, from the user device 10, an annotated document 152, 152A that includes one or more entities 162. The entities 162 may be referred to interchangeably with the term fields 162. Each respective field 162 of the annotated document 152A is labeled by a respective annotation 156. Optionally, the annotations are generated by the user 12. In some examples, the annotations 156 annotate or label the values of key-value pairs included within the annotated document 152A and do not label the key. As discussed in more detail below, each annotation 156 includes, for example, a tag to represent the key and a bounding box to annotate the value of the key.

The document extractor 160, in some examples, receives the annotated document 152A as part of an extraction request 20. For example, the user 12, via the user device 10, transmits the request 20 to the document extractor 160 to extract the fields 154 from one or more documents 152. The request 20 may include the annotated documents 152A. Alternatively, in response to the request 20, the document extractor 160 solicits the annotated documents 152A from the user 12. For example, the document extractor 160, after receiving the request 20, determines that one or more annotated documents 152A are necessary to satisfy the request 20, and in response, requests the user device 10 provide the one or more annotated documents 152A. Each annotated document 152A may include an indication that the annotated document 152A is annotated. For example, the user device 10 includes a specific indicator indicating that that annotated document 152A is annotated. In other examples, the document extractor 160 automatically determines that the annotated document 152A is annotated (e.g., via image processing).

The document extractor 160 includes a cluster controller 210. The cluster controller 210, using a template matching algorithm 212, clusters the annotated document 152A into a cluster 170, 170*a*—n. That is, the template matching algorithm 212 groups or clusters the annotated document 152A into a cluster 170 that includes other similar documents 152. For example, the cluster controller 210 clusters the annotated document 152A into a respective cluster 170 when the annotated document 152A satisfies a similarity threshold with the other documents 152 in the cluster 170. When the annotated document 152A is sufficiently dissimilar from the documents 152 of each existing cluster 170 (or when no clusters 170 yet exist), the cluster controller 210 may assign the annotated document 152A to a new cluster 170. In some examples, the document extractor 160 receives or obtains a set of annotated document 152A, and the cluster controller 210, for each respective annotated document 152A in the set, clusters, using the template matching algorithm, the respective annotated document 152A into one of the clusters 170.

In the example of FIG. 1, the cluster controller 210 generates three clusters 170, 170*a*—c. Each cluster 170*a*—c includes a number of documents 152. Here, the cluster controller 210, when receiving an annotated document 152A, determines whether to cluster the annotated document 152A into one of the three existing clusters 170*a*—c. When the annotated document 152A fails to be sufficiently similar to the documents 152 of any of the clusters 170*a*—c, the cluster controller 210 may assign the annotated document 152A to a fourth cluster 170 (not shown).

The document extractor 160 also includes an extraction controller 220. The extraction controller 220, for each respective cluster 170, induces a document template 180, 180*a*—n using the annotated documents 152A of the respective cluster 170. Each induced document template 180 represents a base template or cluster representative template for the document extractor 160 (i.e., a "gold standard" document 152 that best represents the documents 152 of the cluster 170). Here, the extraction controller 220 induces a first document template 180*a* for the first cluster 170*a*, a second document template 180*b* for the second cluster 170*b*, and a third document template 180*c* for the third cluster 170*c*. Each document template 180 may be a single empty document 152 (e.g., form) having a fixed set of non-value text and layout. For example, the extraction controller 220 may remove text labeled annotations 156 from a form (e.g., a W2 form) to leave the form "blank" (i.e., not filled in by values).

The document extractor 160 also receives one or more unannotated documents 152, 152U. The unannotated documents 152U include one or more entities 162. However, the entities 162 of the unannotated documents 152U do not include any annotations 156. The cluster controller 210 attempts to cluster each unannotated document 152U into an existing cluster 170. When an unannotated document 152U is not sufficiently similar to any of the existing clusters 170 (i.e., a dissimilar unannotated document 152U), the cluster controller 210 may disregard the dissimilar unannotated document 152U. Alternatively, the document extractor 160 may request an annotated document 152A from the user 12 that is similar to the dissimilar unannotated document 152U so that the cluster controller 210 may generate a new cluster 170 and the extraction controller 220 may induce a new document template 180 based on the new cluster 170. For example, the user 12 may annotate the dissimilar unannotated document 152U and provide the newly annotated document 152A back to the document extractor 160. Alternatively, the user 12 (via the user device 10) provides a different document 152 that is sufficiently similar to the dissimilar unannotated document 152U.

After clustering the unannotated document(s) 152U, the extraction controller 220, for each respective unannotated document 152U, extracts one or more entities 162 from the respective unannotated document 152U using the respective document template 180 for the respective cluster 170 of the respective unannotated document 152U. The document extractor 160 may send the extracted entities 162 (i.e., key-value pairs of the document 152) to the user device 10 and/or store the extracted entities 162 at the data store 150 (e.g., in storage associated with the user 12).

Figure 2A:
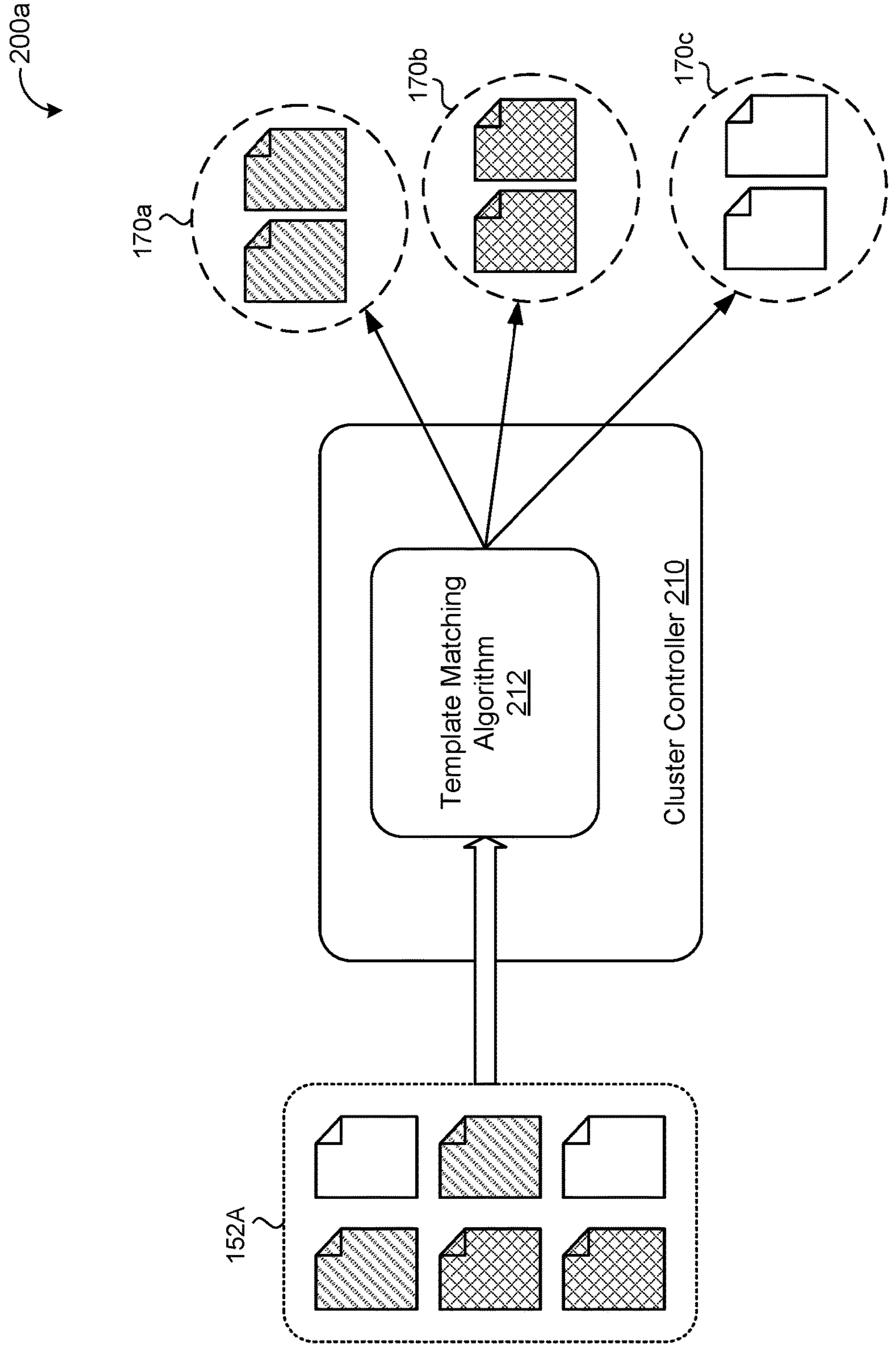
FIG. 2A is a schematic view of a template matching algorithm clustering documents.

Referring now to FIG. 2A, in some implementations, the cluster controller 210 receives a batch or a set of annotated documents 152A simultaneously. The set of annotated documents 152A may include any number of documents 152 of many different types (e.g., different forms) such that the annotated documents 152A belong to different clusters 170. The set of annotated documents 152A may lack any indication of what clusters 170 or document templates 180 each annotated document 152A should be associated with. In these implementations, the cluster controller 210, using the template matching algorithm 212, sorts or clusters each annotated document 152A into the appropriate cluster 170 and generates new clusters 170 when no suitable cluster 170 already exists. In an exemplary schematic view 200*a* of FIG. 2A, the cluster controller 210 receives six annotated documents 152A and clusters two of the annotated documents 152A into a first cluster 170*a*, another two of the annotated documents 152A into a second cluster 170*b*, and the final two annotated documents 152A into a third cluster 170*c*.

In some implementations, the template matching algorithm 212 determines which cluster 170 a document 152 belongs to based on non-value text and layout of the document. Non-value text refers to text (or symbols) that are not entities 162 (i.e., not for extraction). This text should generally remain static from document 152 to document 152 and thus should be the same or nearly the same for each document 152 in the cluster 170. For example, a form that requests a name may include a label "Name:" that is in the same position for each copy of the form. The template matching algorithm 212 must be resistant to a variety of challenges the documents 152 may raise. For example, there may be errors (e.g., optical character recognition (OCR) errors) in non-value text detection or the document may be shifted, scaled, cropped, or otherwise skewed due to acquisition artifacts (e.g., noise, contrast degradation, color shifting, etc.). In some examples, the template matching algorithm includes an unsupervised algorithm, such as an unsupervised bag-of-words algorithm. In these examples, the template matching algorithm 212 may extract words from the document and the document template 180 of a cluster 170 and determine a similarity metric (e.g., by counting the number of words found in both the document 152 and the document template 182). The template matching algorithm 212 may assign the document 152 to a cluster 170 with the highest similarity metric that satisfies a threshold. When the highest similarity metric fails to satisfy the threshold, the cluster controller 210 may instead cluster the document 152 into a new cluster 170. Additionally or alternatively, the template matching algorithm 212 includes other algorithms. For example, the template matching algorithm 212 includes grid matching, a word displacement algorithm, and/or an image-based algorithm.

In some implementations, to scale to large numbers of document templates 180, the cluster controller 210 implements template matching using a two-stage architecture. The first stage includes a scalable retrieval of template candidates that are likely to match the query document 152 (i.e., the document 152 the cluster controller 210 is attempting to assign to a cluster 170). This stage may be optimized for high recall and to reduce a large number of candidate document templates 180 to a manageable set (e.g., less than or equal to one hundred document templates 180). For example, the template matching algorithm 212 uses the bag-of-words algorithm to generate a candidate set of document templates 180. This allows the cluster controller 210 to manage thousands or more clusters 170. In these implementations, the cluster controller 210 implements a second stage that includes a template matching ranker that ranks the templates retrieved in the first stage based on match scores. For example, the template matching algorithm 212 uses a word displacement algorithm to rank each candidate document template 180. The template matching algorithm 212 may select the candidate document template 180 with the highest match score/ranking.

In some examples, an annotated document 152A includes a multi-page document 152. In this case, the cluster controller 210 may treat each page independently (i.e., each page is assigned to a respective cluster 170). In other examples, the cluster controller 210 treats the multi-page document 152 as a sequence of pages where each page is matched against document templates 180 independently and multiple template matches per query document determines each with a match score (e.g., geometric mean of page-level scores) across all matched pages. In yet other examples, the cluster controller 210 treats the multi-page document 152 as a single virtual page. The cluster controller may generate the virtual page using vertical concatenation of all individual pages.

Figure 2B:
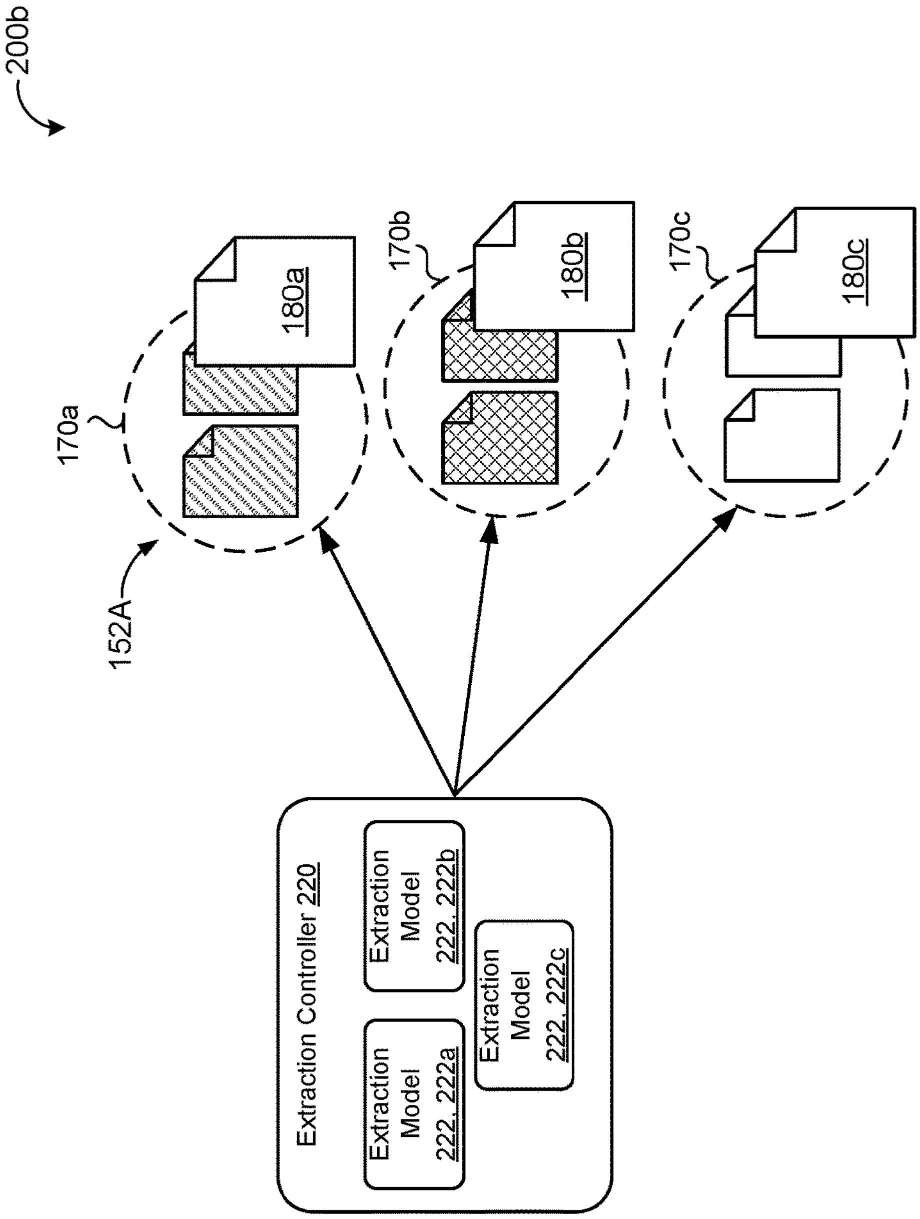
FIG. 2B is a schematic view of an extraction controller generating document templates.

Referring now to FIG. 2B, in some examples, the extraction controller 220 induces the document template 180 for a respective cluster 170 by training an extraction model 222, 222*a*—n using the annotated documents 152A of the respective cluster 170. The extraction controller 220 may train a different extraction model 222 for each cluster 170. Each extraction model 222 is trained using some or all of the annotated documents 152A assigned to the respective cluster 170. A schematic view 200*b* continues the example of FIG. 2A. Here, the extraction controller 220 trains a first extraction model 222*a* for the first cluster 170*a* using the two annotated documents 152A associated with the first cluster 170*a*. Similarly, the extraction controller 220 trains a second extraction model 222*b* for the second cluster 170*b* using the two annotated documents 152A associated with the second cluster 170*b* and a third extraction model 222*c* for the third cluster 170*c* using the two annotated documents 152A associated with the third cluster 170*c*. Each extraction model 222*a*—c induces a respective document template 180 for the respective cluster 170. That is, the first extraction model 222*a* induces a first document template 180*a* representative of the first cluster 170*a*, the second extraction model 222*b* induces a second document template 180*b* representative of the second cluster 170*b*, and the third extraction model 222*c* induces a third document template 180*c* representative of the third cluster 170*c*.

When the cluster controller 210 assigns or clusters a new annotated document 152A to a cluster 170 that has an existing document template 180 (i.e., as opposed to a new cluster 170 that does not yet have an existing document template 180), the extraction controller 220 may use the new annotated document 152A to update or enhance the document template 180. That is, in some implementations, the extraction controller 220 updates the document template 180 each time a new annotated document 152A is assigned to the respective cluster 170. For example, the extraction controller 220 retrains or updates the corresponding extraction model 222 using the new annotated document 152A. In some examples, the extraction controller 220 may require multiple annotated documents 152A be assigned to a cluster 170 prior to generating a valid document template 180 (e.g., two annotated documents 152A, five annotated documents 152A, ten annotated documents 152A, etc.). Multiple annotated documents 152A in the same cluster may provide signals for fixed vs. non-fixed text which is useful for key-value classification. In other examples, the extraction controller 220 requires only a single annotated document 152A to generate the document template 180 and updates the document template 180 using each additional annotated document 152A beyond the first.

In some implementations, the extraction controller 220 induces the document templates 180 in part by classifying key-value pairs of each document 152 in the cluster 170. The representative document template 180 (i.e., the document template 180 representative of each document 152 assigned to the cluster 170) should generally be free of image noise (e.g., blur, uneven lighting, contrast degradation, skew, etc.). The extraction controller 220 may evaluate each document 152 in the cluster to determine the optimal document 152 to select for the basis of the document template 180. In some examples, the extraction controller 220 merges portions of different documents 152 together to generate the document template 180. The extraction controller 220 may evaluate the quality of each document 152 based on an end-to-end entity extraction accuracy which measures the accuracy of entity extraction using a template induced from each document 152 respectively. The extraction controller 220 may implement any number of algorithms to select the representative document 152, such as random selection or OCR word variance removal which removes labeled content and any remaining value text from each document.

Figure 2C:
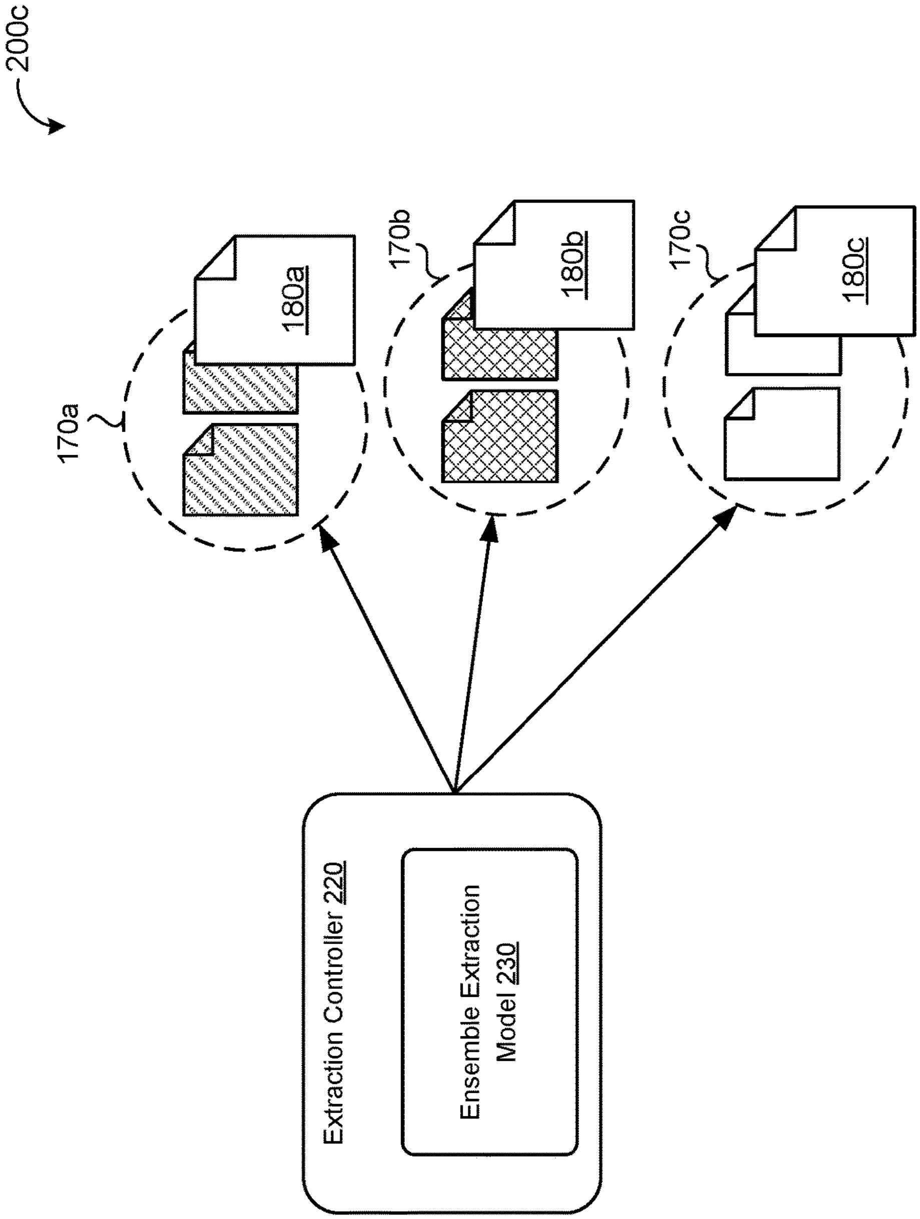
FIG. 2C is a schematic view of an ensemble extraction model.

Referring now to FIG. 2C, in some implementations, the extraction controller 220 combines two or more extraction models 222 into a single ensemble extraction model 230. That is, the extraction controller 220 may combine the extraction model 222 from one cluster 170 with the extraction model 222 from a different cluster 170. Optionally, the extraction controller 220 ensembles each extraction model 222 for every cluster 170 together. In schematic view 200*c*, the extraction controller 220 combines the extraction models 222*a*—c (FIG. 2B) into a single ensemble extraction model 230 that leverages each of the combined extraction models 222 to improve performance.

Figure 3:
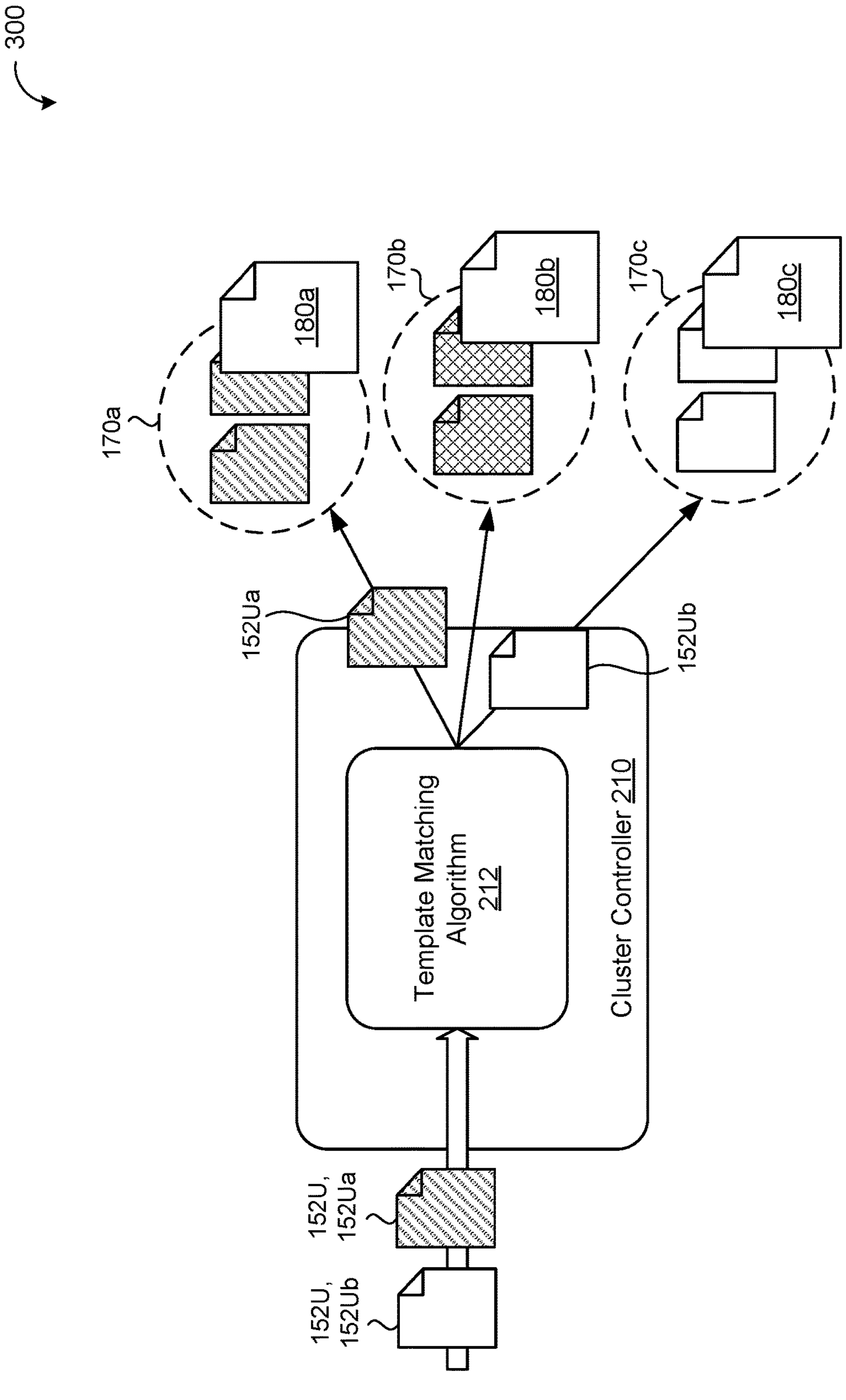
FIG. 3 is a schematic view of a template matching algorithm clustering multiple documents simultaneously.

Referring now to FIG. 3, in some implementations, the cluster controller 210 obtains a set or batch of unannotated documents 152U simultaneously. For example, the user 12 provides (e.g., via the request 20 and/or from the data store 150) multiple unannotated documents 152U to the cluster controller 210 for entity extraction. The multiple unannotated documents 152U may lack any order or sorting or any indication of clusters 170 or document templates 180 the unannotated documents 152U are associated with. In this scenario, the cluster controller 210, for each respective unannotated document 152U, clusters the respective unannotated document 152U into the appropriate cluster 170 (e.g., based on threshold similarity scores or the like) so that the extraction controller 220 may extract the entities 162 from the respective unannotated document 152U using the document template 180 associated with the cluster 170 the respective unannotated document 152U is assigned.

When clustering the unannotated documents 152U, the template matching algorithm may ignore portions of the document that are associated with entities 162. That is, the template matching algorithm 212 relies on the portions of the unannotated document 152U that remain static relative to other documents 152 in the cluster and disregards the values (i.e., the entities 162) when attempting to match the unannotated document 152U to a document template 180 and/or cluster 170.

In schematic view 300 of FIG. 3, the example of FIG. 2C is continued. Here, the cluster controller 210 receives a first unannotated document 152U, 152Ua and a second unannotated document 152U, 152Ub simultaneously. The cluster controller 210, using the template matching algorithm 212, clusters the first unannotated document 152Ua to the first cluster 170*a* and the second unannotated document 152Ub to the third cluster 170*c*. While not shown here, the extraction controller 220, using the first document template 180*a*, extracts one or more entities 162 from the first unannotated document 152Ua and, using the third document template 180*c*, extracts one or more entities 162 from the third unannotated document 152Uc. In some examples, in addition to the extraction controller 220 or alternative to the extraction controller 220, a downstream application extracts the entities 162 from the documents 152. The extraction controller 220 and/or downstream application may use any number of techniques to extract the entities 162 using the document templates 180. For example, the extraction controller 220 may implement a machine learning based extraction algorithm or a harvester algorithm.

Figure 4:
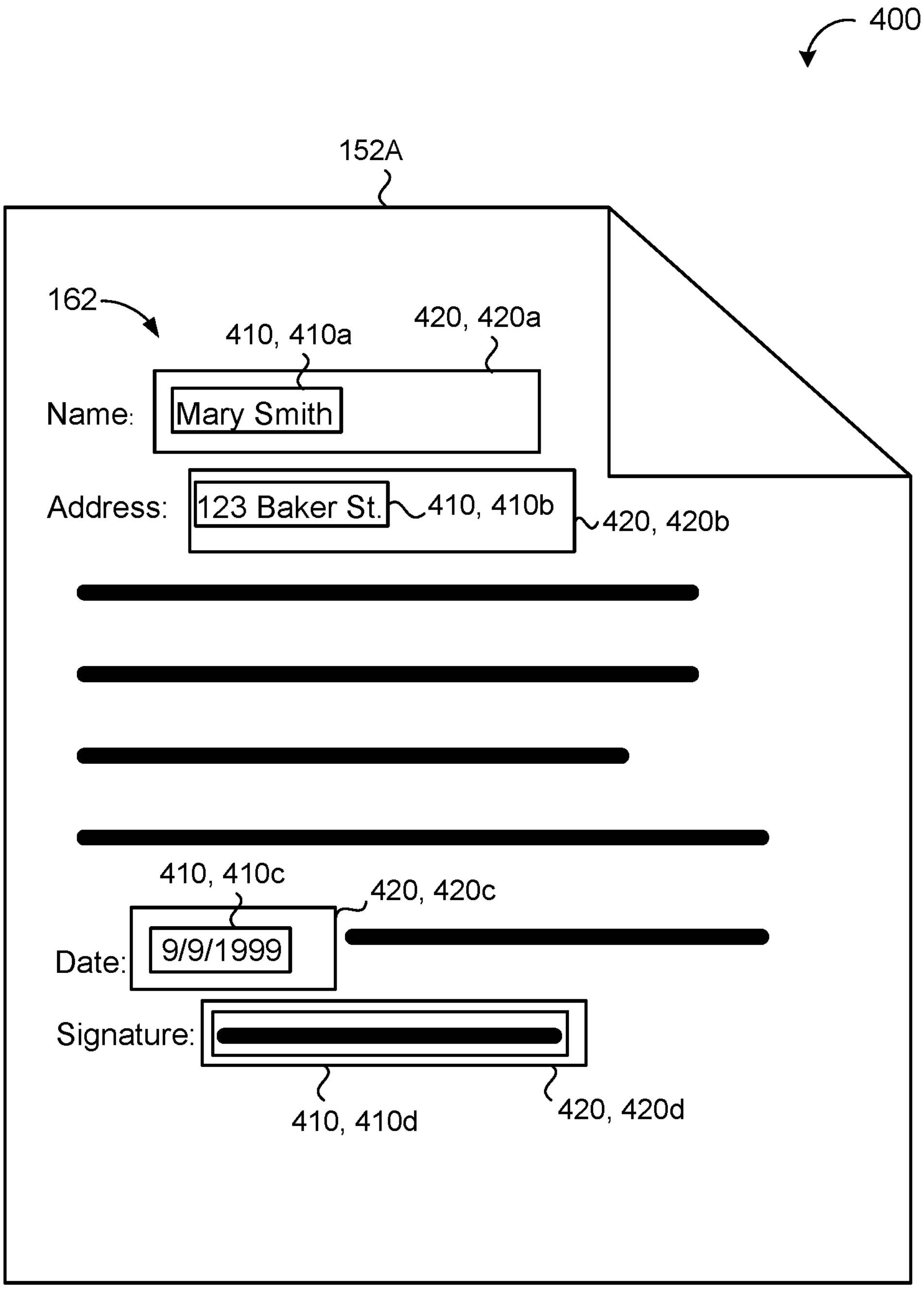
FIG. 4 is a schematic view of a document annotated with bounding boxes.

Referring now to FIG. 4, in some implementations, the annotations 156 of the annotated documents 152A includes bounding boxes 410. For example, the user 12, a machine learning algorithm, etc., provides a bounding box 410 around each entity 162 desired for extraction. Here, schematic view 400 includes an example annotated document 152A with four bounding boxes 410, 410*a*—d. A first bounding box 410*a* encapsulates an entity 162 (i.e., "Mary Smith") and a second bounding box 410*b* encapsulates another entity (i.e., "123 Baker St."). Similarly, a third bounding box 410*c* encapsulates a third entity and a fourth bounding box 410*d* encapsulates a fourth entity 162.

In some examples, the extraction controller 220, when inducing the document templates 180, determines, for one or more of the bounding boxes 410, a maximal bounding box estimation 420. The maximal bounding box estimation 410 represents an estimate the largest a bounding box around an entity 162 may be without encapsulating information that is not a part of the entity 162 (e.g., other fields in a form). In general, the maximal bounding box estimation 420 for an entity 162 is larger than the corresponding bounding box 410 provided by the annotations 156. Here, the first bounding box 410*a* is encapsulated by a first maximal bounding box estimation 420, 420*a*. Similarly, the second bounding box 410*b* is encapsulated by a second maximal bounding box estimation 420, 420*b*; the third bounding box 310*c* is encapsulated by a third maximal bounding box estimation 420, 420*c*; and the fourth bounding box 410*d* is encapsulated by a fourth maximal bounding box estimation 420, 420*d*.

The extraction controller 220 (or other downstream extraction algorithms) uses the maximal bounding box estimation 420 to retrieve the relevant text (e.g., via OCR) or other visual element (e.g., a checkbox, a signature, etc.) from the document 152. The maximal bounding box estimation 420 helps account for potential variations in entity 162 placement within a document 152. For example, a document 152 may include signatures in slightly different places on each form. In some cases, a signature of a second document 152 may not be within a bounding box 410 of a first document 152, while the signature remains within the same maximal bounding box estimation 420 (i.e., due to the larger size of the maximal bounding box estimation 420).

In some examples, the extraction controller 220 determines an intersection over union (IoU) area between the bounding box 410 and the respective maximal bounding box estimation 420. The extraction controller 220 may determine whether the maximal bounding box estimation 420 is valid based on the IoU area. For example, when the maximal bounding box estimation 420 satisfies a threshold value (e.g., greater than or equal to 0.8), the extraction controller 220 determines that the maximal bounding box estimation 420 is valid. When the maximal bounding box estimation 420 is invalid, the extraction controller 220 may generate a new maximal bounding box estimation 420 with different dimensions and try again. Additionally or alternatively, the extraction controller 220 tests the maximal bounding box estimation 420 against each document 152 in the corresponding cluster 170 to determine a precision of the maximal bounding box estimation 420. The precision defines how frequently the maximal bounding box estimation 420 contains all of the entity 162 (and no other text or values). When the precision of the maximal bounding box estimation 420 satisfies a threshold (e.g., the precision is greater than the threshold), the extraction controller 220 may determine that the maximal bounding box estimation 420 is valid. When the precision fails to satisfy the threshold, the extraction controller 220 may generate a new maximal bounding box estimation 420 with different dimensions and repeat the process.

The extraction controller 220 may generate the maximal bounding box estimation 420 in any number of ways. For example, the extraction controller 220 expands the bounding box 410 until the bounding box reaches the next symbol (e.g., via OCR). As another example, the extraction controller 220 may use a region growing or other image segmentation method. Specifically, the extraction controller 220 may represent the document 152 as a grid and project text, lines, and other symbols of the document 152 onto the grid. The extraction controller 220 may consider such text as "obstacles" and draw bounding boxes as "seed" rectangular islands on top of the grid. The extraction controller 220 assigns each island a unique identification. The extraction controller 220 "grows" the seed islands to adjacent cells concurrently in all directions until another obstacle is met. The extraction controller 220 may fit the largest rectangle into each expanded seed region to represent the maximal bounding box estimation 420.

Figure 5:
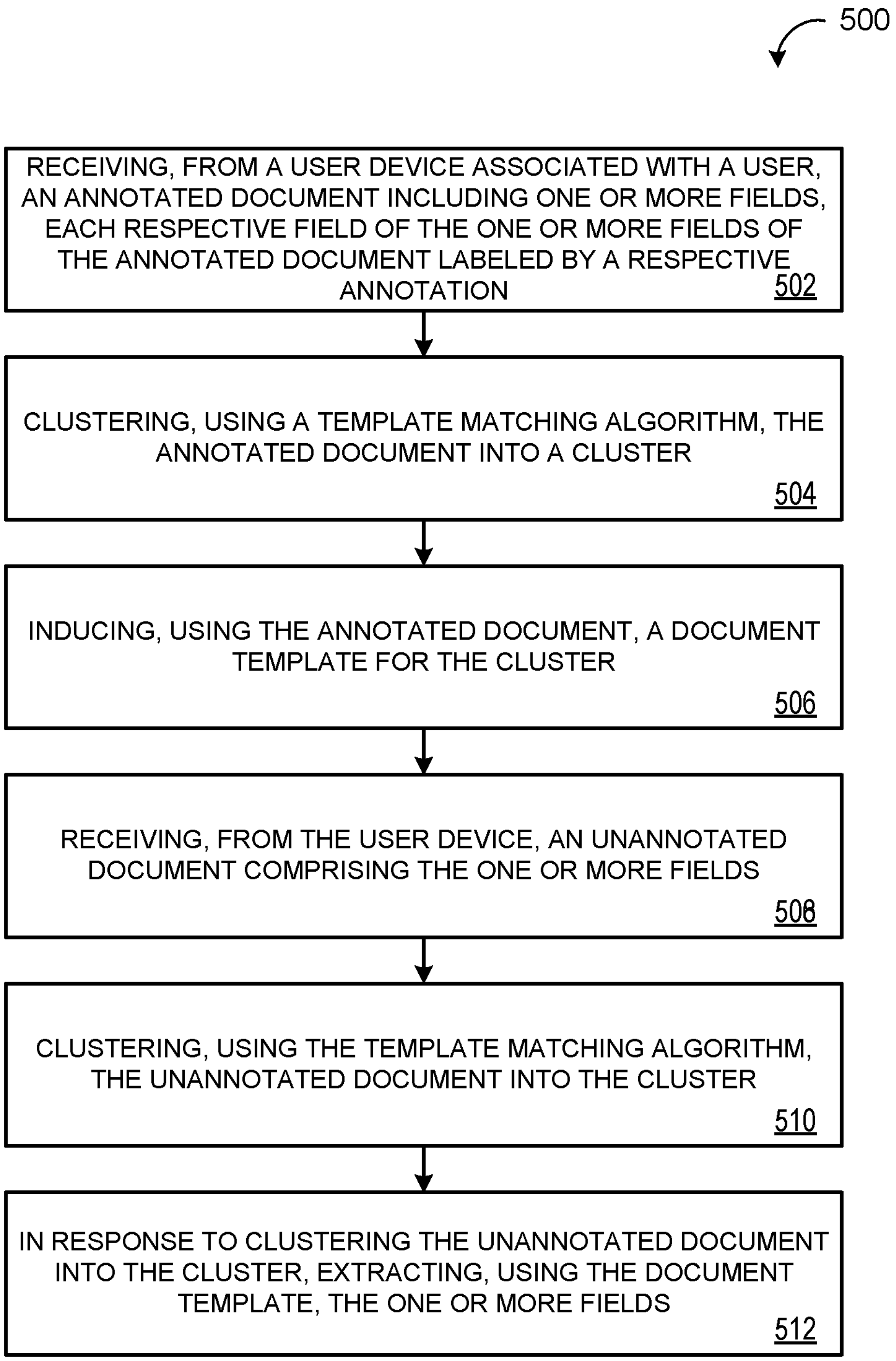
FIG. 5 a flowchart of an example arrangement of operations for a method for document extraction template induction.

FIG. 5 is a flowchart of an exemplary arrangement of operations for a computer-implemented method 500 for document extraction template induction. The method 500, when executed by data processing hardware 18, 144, causes the data processing hardware 18, 144 to perform operations. The method 500, at operation 502, includes receiving, from a user device 10 associated with a user 12, an annotated document 152A. The annotated document 152A includes one or more fields 162. Each respective field 162 of the one or more fields 162 of the annotated document 152A is labeled by a respective annotation 156. The method 500, at operation 504, includes clustering, using a template matching algorithm 212, the annotated document 152A into a cluster 170. At operation 506, the method 500 includes inducing, using the annotated document 152A, a document template 180 for the cluster 170. The method 500, at operation 508, includes receiving, from the user device 10, an unannotated document 152U including the one or more fields 162. At operation 510, the method 500 includes clustering, using the template matching algorithm 212, the unannotated document 152U into the cluster 170. At operation 512, the method 500 includes, in response to clustering the unannotated document 152U into the cluster 170, extracting, using the document template 180, the one or more fields 162.

Figure 6:
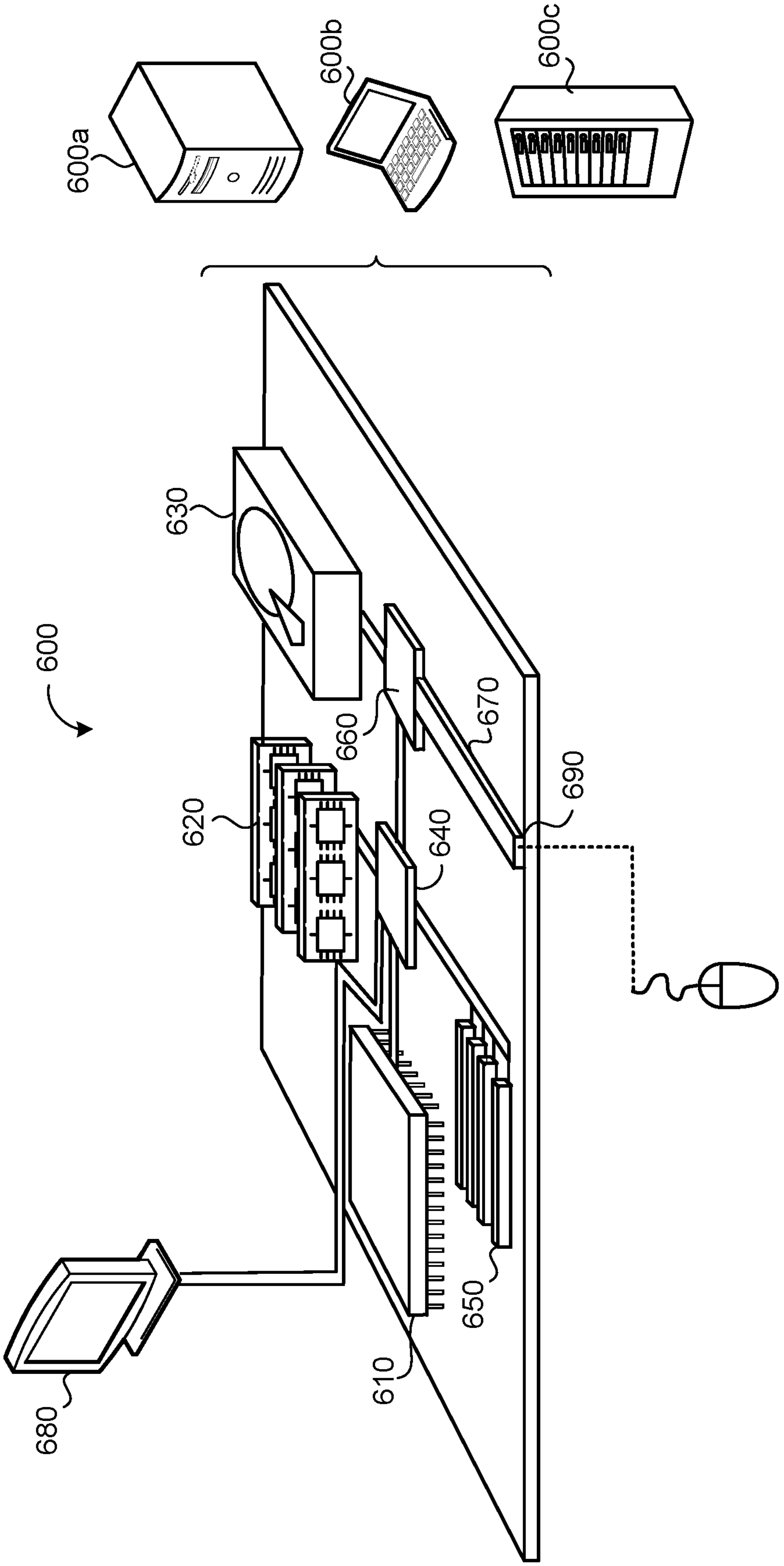
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an “application,” an “app,” or a “program.” Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
- receiving, from a user device associated with a user, an annotated document, the annotated document comprising one or more fields, each respective field of the one or more fields of the annotated document labeled by a respective annotation;
- determining, using a template matching algorithm that evaluates non-value text and structural layout features of documents, that the annotated document fails to satisfy a similarity threshold with each cluster in a set of clusters;
- based on determining that the annotated document fails to satisfy the similarity threshold, clustering, using the template matching algorithm, the annotated document into a new cluster of the set of clusters;
- inducing, using the annotated document assigned to the new cluster, a document template for the new cluster, the document template defining expected spatial locations of the one or more fields relative to non-value text and structural layout features of the annotated document;
- receiving, from the user device, an unannotated document comprising the one or more fields;
- clustering, using the template matching algorithm, the unannotated document into the new cluster; and
- in response to clustering the unannotated document into the new cluster, extracting, using the document template, the one or more fields by applying the defined expected spatial locations of the one or more fields from the document template to the unannotated document to identify and retrieve content from corresponding regions.

2. The method of claim 1, wherein inducing the document template for the new cluster comprises training an extraction model using the annotated document.

3. The method of claim 2, wherein the operations further comprise combining the extraction model for the new cluster with another extraction model from a different cluster.

4. The method of claim 1, wherein the operations further comprise:
- receiving, from the user device, a second annotated document, the second annotated document comprising one or more different fields, each respective different field of the one or more different fields of the second annotated document labeled by a respective annotation; and
- clustering, using the template matching algorithm, the second annotated document into a second cluster of the set of clusters; and
- inducing, from the second annotated document, a second document template for the second cluster.

5. The method of claim 1, wherein obtaining the annotated document comprises requesting, from the user device, the annotated document.

6. The method of claim 1, wherein the template matching algorithm comprises an unsupervised algorithm.

7. The method of claim 1, wherein each respective annotation comprises a tag and a bounding box.

8. The method of claim 1, wherein the annotated document comprises a form.

9. The method of claim 1, wherein the operations further comprise:
- receiving, from the user device, a set of unannotated documents, each respective unannotated document of the set of unannotated documents comprising one or more respective fields; and
- for each respective unannotated document in the set of unannotated documents:
  - clustering, using the template matching algorithm, the respective unannotated document into a respective cluster, the respective cluster associated with a respective document template; and
  - extracting, using the respective document template, the one or more respective fields.

10. The method of claim 1, wherein the template matching algorithm comprises a bag-of-words algorithm.

11. A system comprising:
- data processing hardware; and
- memory hardware in communication with the data processing hardware, the memory hardware storing instructions that when executed on the data processing hardware cause the data processing hardware to perform operations comprising:
  - receiving, from a user device associated with a user, an annotated document, the annotated document comprising one or more fields, each respective field of the one or more fields of the annotated document labeled by a respective annotation;
  - determining, using a template matching algorithm that evaluates non-value text and structural layout features of documents, that the annotated document fails to satisfy a similarity threshold with each cluster in a set of clusters;

based on determining that the annotated document fails to satisfy the similarity threshold, clustering, using the template matching algorithm, the annotated document into a new cluster of the set of clusters;

inducing, using the annotated document assigned to the new cluster, a document template for the new cluster, the document template defining expected spatial locations of the one or more fields relative to non-value text and structural layout features of the annotated document;

receiving, from the user device, an unannotated document comprising the one or more fields;

clustering, using the template matching algorithm, the unannotated document into the new cluster; and in response to clustering the unannotated document into the new cluster, extracting, using the document template, the one or more fields by applying the defined expected spatial locations of the one or more fields from the document template to the unannotated document to identify and retrieve content from corresponding regions.

12. The system of claim 11, wherein inducing the document template for the new cluster comprises training an extraction model using the annotated document.

13. The system of claim 12, wherein the operations further comprise combining the extraction model for the new cluster with another extraction model from a different cluster.

14. The system of claim 11, wherein the operations further comprise:

receiving, from the user device, a second annotated document, the second annotated document comprising one or more different fields, each respective different field of the one or more different fields of the second annotated document labeled by a respective annotation; and clustering, using the template matching algorithm, the second annotated document into a second cluster of the set of clusters; and inducing, from the second annotated document, a second document template for the second cluster.

15. The system of claim 11, wherein obtaining the annotated document comprises requesting, from the user device, the annotated document.

16. The system of claim 11, wherein the template matching algorithm comprises an unsupervised algorithm.

17. The system of claim 11, wherein each respective annotation comprises a tag and a bounding box.

18. The system of claim 11, wherein the annotated document comprises a form.

19. The system of claim 11, wherein the operations further comprise:

receiving, from the user device, a set of unannotated documents, each respective unannotated document of the set of unannotated documents comprising one or more respective fields; and for each respective unannotated document in the set of unannotated documents:

clustering, using the template matching algorithm, the respective unannotated document into a respective cluster, the respective cluster associated with a respective document template; and extracting, using the respective document template, the one or more respective fields.

20. The system of claim 11, wherein the template matching algorithm comprises a bag-of-words algorithm.

* * * * *